Patented Mar. 20, 1928.

UNITED STATES PATENT OFFICE.

1,663,446

CLARENCE F. DINLEY, OF DETROIT, MICHIGAN, ASSIGNOR TO REX PRODUCTS & MANUFACTURING COMPANY, OF DETROIT, MICHIGAN, A CORPORATION OF MICHIGAN.

METAL-CLEANING SOLUTION.

No Drawing.   Application filed July 19, 1924.   Serial No. 727,035.

This invention relates to solutions for the treatment of iron, steel and similar metallic alloys for the purpose of relieving surfaces thereof of oxides such as of iron, corrosive substances such as soldering fluxes, and oils such as result from human contact or which may be otherwise present on such surfaces, and for the preventing of the reformation of oxides or deleterious matter on the treated surfaces prior to or after the coating application thereto of paint, enamel, varnish or other similar coatings.

The general object of the said invention is to produce a solution particularly adapted for these purposes characterized by its action in which the surface tension of oil on such surfaces is reduced to permit the ready and complete flow of the solution thereover and to facilitate its action, wherein a low acidity of the solution may be efficiently obtained with consequent reduction of the action of the solution on the metallic surface itself, and whereby sufficient specific gravity is given to the solution to encourage the detachment of the rust, oil and other foreign matter from the surface under treatment and the flowing of such detached foreign matter and the products of reaction from the said metallic surface and on the surface of the said solution.

Consequently, the purpose of the said invention is to produce a solution which will be mild in its action, as far as its effect on the metallic surface itself is concerned, as distinguished from a pickling solution, whilst being very efficient in its action on the foreign matter which it is the purpose of the solution to remove from the said surface, and in its deposition of a rust proof coating on the cleaned surface.

It has been suggested, from time to time, to treat iron and steel with cleansing materials containing acids such, for example, as phosphoric acid having a solvent action on the oxides ordinarily present on surfaces of iron and steel and also with solvents such as alcohol for the removal of grease or oil from such surfaces; and it has been still further proposed in several instances to make use of the preservative commonly resulting from the action of the cleanser to coat and protect the treated surfaces from further attack by moisture, or corrosive matter in the coatings to be applied thereto, this protective coating being either phosphate or phosphide of iron resulting from chemical action between the acid and the iron.

Satisfactory results with such treatments can only be secured when all the factors relating to proportion of ingredients, method of application and time are fully controlled; and, furthermore, the use of such cleaning and preserving medium due to their purely solvent action necessitates great care in the removal of the medium after use in order to insure the proper removal of the loosened or dissolved oxides, oils or foreign matter, due to the fact that wherever any of the medium remains, a certain amount of the product of reaction also exists and is still present, on the treated surfaces if any of the medium be allowed to evaporate thereon even though it may appear to have been entirely removed. The action of the removing necessitating an appreciable rubbing of the treated surface, also makes possible the erasing of the deposit thereby affecting the film of iron phosphate or phosphide.

Still further objects are, therefore, to provide a different mechanical condition in the removal of the undesirable foreign matter and oxides from the surface and the treatment, which mechanical condition reduces or eliminates the necessity of applying appreciable friction to the treated surfaces for the elimination of products of reaction, and a different chemical reaction resulting in the deposit of a rust proofing coating on the treated surface.

An object of the said invention is further to provide a solution particularly adaptable for the carrying out of the method of removing rust and grease from metallic surfaces described in my co-pending application Ser. No. 727,036.

Although the depositing of an oxygen excluding film on treated metallic surfaces in order to prevent the re-oxidizing of the surface is very desirable, it is essential that the treating of the surface preparatory to the depositing of such film should be very thorough and effective otherwise the entrapping beneath the said film of any deleterious substances will affect the continuity of the film, reduce its effective efficiency or otherwise permit the occlusion hereunder of gases or undesirable chemical action after the application of paint or other coating to the treated surface, thus reducing the durability and efficiency of such coating. Phosphoric and similar acids as heretofore used form both the rust removing, or etching mediums and the means forming the rust proofing film, and by my invention I especially provide an etching acid in addition to the means forming the rust proofing film which results in what may be termed a two stage process involving a double chemical decomposition.

In carrying out my invention I propose to make use of any of the tannins, tannic acid, gallic acid, pyrogallic acid or similar acids of this group together with sulphuric acid diluted with water to a substantial extent whereby the acid solution will be weak as compared with the phosphoric or similar solutions heretofore referred to; and to make such weak acid solution effective I add alcohol or alcohols of a nature and strength adapted to break down the surface tension of oils on the surface to be treated as distinguished from the absolute dissolving of such oils, together with a soluble metallic salt which I use for the loading of the solution to increase its specific gravity to an extent whereby the oils, rusts and foreign matter attacked by the said solution are mechanically acted upon to effect their detachment from the surface under treatment.

Thus it will be seen that a combination of circumstances are brought into effect, by the application of the solution referred to, which mutually aid in the removal of the foreign matter from the metallic surface and in which the mechanical aid admits of the reduction of the intensity of the chemical aid consequently permitting a lower acidity in the solution with greater freedom from action upon the metallic surface itself than is feasible with solutions employing acids for similar purposes as heretofore known.

A preferred formula embodying the said invention is as follows: Water, 26 gallons (U. S.); sulphuric acid, 3 gallons; anhydrous manganese sulphate, 35 lbs.; technical tannic acid, 15 lbs.; denatured alcohol, 15 gallons (U. S.); normal butyl alcohol, 5 gallons; acetone, 7 gallons. The manganese sulphate in this case being the salt which effects the required increase in specific gravity referred to. The sulphuric acid used is the commercially concentrated grade which has a specific gravity of 1.84.

In this formula, it will be understood, any etching acid may be used in place of the sulphuric acid and the two alcohols may be varied, one or other being eliminated if so desired according to the condition of the surface to be treated, and the acetone may also be eliminated if thought necessary or desirable. It will be readily understood that the chemical equivalents for the said acids or solvents may be used whilst still retaining the combined chemical and mechanical action hereinbefore referred to, the specific formula being given as an example of solution which will very effectively operate under all normal conditions of rust and oil fouling of metallic surfaces usually met with in practice.

This solution effects, more especially upon dilution after its application, the depositing of a protective film on the metallic surface of iron tannate (or iron gallate where pyrogallic or gallic acid is used) after the chemical and mechanical detachment of the foreign material from the said metallic surface, and as such foreign material is effectively removed and is not merely in a state of solution or partial suspension in the solution elimination of such foreign material from beneath or incorporation in the said film is effectively obtained.

After treatment of a metallic surface with the said solution and the deposit of the said film thereon the solution together with the material floated on the same may be easily washed from the surface by means of a stream of water or of steam or in any other suitable manner, the removal of the solution requiring no harsh treatment which would tend to disrupt or otherwise be detrimental to the protective film.

A distinguishing peculiarity in the action of the solution should be noted: When an iron surface is subjected to its action the acid of the solution combines with the iron of the oxide on the surface forming iron sulphate, and a second decomposition occurs in which the tannic acid combines with the iron of the said sulphate forming iron tannate which is precipitated upon the iron surface as a rust preventing film upon the dilution of the solution as in its removal from said surface.

If the solution be diluted for its removal before sufficient time has elapsed for the proper formation of iron tannate the presence of the manganese sulphate will result in a precipitation of manganese tannate which will form a rust proofing film which however for all purposes is not as effective as the iron tannate but admits of a speedier operation when this is desirable.

Herein and in the claims appended hereto the term "solution" as applied to the admission of ingredients forming the medium for the treatment of metallic surfaces in the manner described is used in the broad sense only and is not intended to be strictly an indication of the physical nature of the medium which is not entirely a solution but an admixture and which is also not entirely a solvent for the foreign matter but a mechanical cleaner in addition to its property of precipitating a protective film of iron tannate or gallate.

What I claim is:—

1. A composition for the preparation of metallic surfaces, for subsequent coatings, including a solvent for the oxide of the metal being cleaned, an acid of the tannin group, and an oil solvent.

2. A composition for the preparation of metallic surfaces, for subsequent coatings, including a solvent for the oxide of the metal being cleaned, an acid of the tannin group, an oil solvent and a soluble metallic salt.

3. A composition for the preparation of metallic surfaces for subsequent coatings, including a dilute etching acid, a soluble metallic salt, an acid of the tannin group, and an oil solvent.

4. A composition for the preparation of metallic surfaces for subsequent coatings, including a dilute etching acid, a soluble metallic salt, an acid of the tannin group, and an oil solvent adapted to break down the surface tension of oil on said metallic surfaces.

5. A composition for the preparation of metallic surfaces for subsequent coatings, including a solvent for the oxide of the metal being cleaned, an acid of the tannin group, an oil solvent, and anhydrous manganese sulphate.

6. The method of cleaning and rust proofing metallic surfaces which consists in subjecting said surfaces to a solution containing solvents for the iron oxide and solvents for the oil including an etching acid and acid of the tannin group, whereby the oxide is decomposed by the etching acid and the resulting iron compound further decomposed by the other acid, and then reducing the acidity of the solution by dilution to cause precipitation of the resulting iron compound.

7. The method of cleaning and rust proofing metallic surfaces which consists in subjecting said surfaces to a solution containing solvents for the iron oxide and solvents for the oil including an etching acid and tannic acid whereby the oxide is decomposed by the etching acid and the resultant iron compound decomposed by the tannic acid to form iron tannate, and effecting the precipitation of the iron tannate by dilution of the solution.

8. The method of cleaning and rust proofing metallic surfaces which consists in subjecting such surfaces to the action of a composition including a solvent for the oxide of the metal being cleaned, an acid of the tannin group, and an oil solvent, and diluting the composition to effect the precipitation of the results of the reaction of the oxide solvent and of the said acid.

9. A composition for the preparation of metallic surfaces for subsequent coatings comprising the following approximate formula: Water, 26 gallons; sulphuric acid, 3 gallons; anhydrous manganese sulphate, 35 lbs.; technical tannic acid, 15 lbs.; denatured alcohol, 15 gallons; normal butyl alcohol, 5 gallons; acetone, 7 gallons.

In testimony whereof I affix my signature.

CLARENCE F. DINLEY.